United States Patent
Atkins

(10) Patent No.: US 6,290,312 B1
(45) Date of Patent: Sep. 18, 2001

(54) INCREMENTAL BRAKE PRESSURE INCREASES FOR SPEED SENSITIVE SURFACES

(75) Inventor: Thomas M. Atkins, Ann Arbor, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 09/608,320

(22) Filed: Jun. 30, 2000

Related U.S. Application Data

(63) Continuation of application No. PCT/US98/27815, filed on Dec. 30, 1998.
(60) Provisional application No. 60/070,120, filed on Dec. 31, 1997.

(51) Int. Cl.$^7$ ........................................................ B60T 8/00
(52) U.S. Cl. ............................. 303/154; 303/177; 303/121
(58) Field of Search ..................................... 303/165, 169, 303/176, 177, 178, 113.1, 166, 156, 157, 158, 121, 148–150, 186, 174; 188/181 A, 181 C; 701/70, 71, 74, 78, 80, 79, 82, 83, 90

(56) References Cited

U.S. PATENT DOCUMENTS

| | | |
|---|---|---|
| 3,944,289 | 3/1976 | Jones . |
| 4,033,634 * | 7/1977 | Arai et al. . |
| 4,722,576 | 2/1988 | Matsuda . |
| 4,790,607 * | 12/1988 | Atkins . |
| 4,881,784 | 11/1989 | Leppek . |
| 4,933,858 | 6/1990 | Matsuda . |
| 5,092,662 | 3/1992 | Okubo . |
| 5,332,301 | 7/1994 | Roll et al. . |
| 5,369,585 | 11/1994 | Okubo . |
| 5,522,652 * | 6/1996 | Negrin et al. . |
| 5,838,259 | 11/1998 | Tonkin . |

FOREIGN PATENT DOCUMENTS

| | | |
|---|---|---|
| 42 08 048 A1 | 9/1993 | (DE) . |
| 0 380 882 A2 | 8/1990 | (EP) . |
| 9933689 * | 7/1999 | (WO) . |

* cited by examiner

Primary Examiner—Douglas C. Butler
(74) Attorney, Agent, or Firm—MacMillian, Sobanski & Todd, LLC

(57) ABSTRACT

During wheel speed sneakdown conditions, a deceleration threshold in an anti-lock brake system control algorithm is incrementally increased to enhance the anti-lock braking system effort.

10 Claims, 7 Drawing Sheets

INCREMENTAL BRAKE PRESSURE INCREASES FOR SPEED SENSITIVE SURFACES

CROSS REFERENCE TO RELATED APPLICATIONS

This application is a continuation of PCT Patent Application No. PCT/US98/27,815 filed on Dec. 30, 1998, published as WO 99/33689, which claims priority of U.S. provisional application No. 60/070,120 filed Dec. 31, 1997.

BACKGROUND OF THE INVENTION

This invention relates in general to algorithms for anti-lock brake systems and in particular to a control algorithm which provides improved control of wheel brake pressure on speed sensitive road surfaces.

Braking a vehicle in a controlled manner under adverse weather conditions, such as rain, snow or ice, generally requires precise application of the vehicle wheel brakes by the vehicle operator. Under these conditions, or in panic stop situations, a driver will often apply excessive brake pressure which causes the vehicle wheels to lock-up such that excessive slippage between the wheels and the road surface takes place. Wheel lock-up conditions can lead to loss of directional stability and, possibly, uncontrolled vehicle spinout. Accordingly, an Anti-lock Brake System (ABS) is often included as standard or optional equipment on new vehicles. When actuated, the ABS is operative to control the operation of the vehicle wheel brakes to prevent lock-up of the associated vehicle wheels. One type of ABS controls only the rear vehicle wheel brakes. Such a system is referred to as a RWAL in the following description.

A typical prior art RWAL system 10 is illustrated in FIG. 1. The RWAL system 10 includes a normally open solenoid valve 22 connected between the vehicle master cylinder 14 and the controlled rear wheel brakes 20a and 20b. When actuated, the normally open solenoid valve 22 closes to isolate the rear wheel brakes 20a and 20b from the master cylinder 14. Accordingly, the normally open solenoid valve 22 is referred to below as an isolation valve. The isolation valve 22 also can be selectively opened to increase the pressure at the rear wheel brakes 20a and 20b. The RWAL system 10 also includes a normally closed solenoid valve 26, which is referred to below as a dump valve. The dump valve 26 is selectively opened to reduce the pressure at the rear wheel brakes by bleeding brake fluid from the rear wheel brakes 20a and 20b to an accumulator 28. The isolation and dump valves 22 and 26 are mounted within a control valve 21.

The vehicle brake system master cylinder 14 provides a source of pressurized hydraulic brake fluid to the RWAL system 10. Thus, a separate hydraulic source, such as a motor driven pump, which is usually included in a four wheel ABS, is not needed. This reduces the complexity and cost of manufacturing the RWAL system 10, which is typically referred to as a passive system. The RWAL system 10 further includes an electronic control module 30 which is electrically connected to a wheel speed sensor 40 and to the isolation and dump valves 22 and 26. The control module 30 can be mounted directly upon the control valve 21 or located remotely therefrom.

The control module 30 includes a microprocessor (not shown) which is programmed to control the RWAL system in accordance with a control algorithm and parameters permanently stored in a Read Only Memory (ROM). Typically, the control algorithm is trimmed for the particular vehicle in which the ABS is installed. The microprocessor also can access a Random Access Memory (RAM) for temporary storage and retrieval of data. A detailed description of the RWAL system 10 illustrated in FIG. 1 is included in U.S. Pat. Nos. 4,790,607 and 4,886,322.

During vehicle operation, the microprocessor in the ABS electronic control module 30 continuously receives speed signals from the wheel speed sensor 40. During a vehicle braking cycle, the ABS microprocessor monitors the rear wheel speed and deceleration. The microprocessor calculates a theoretical speed ramp, which represents the speed the vehicle would travel if decelerated at a predetermined maximum rate, such as, for example, 1.0 g. The microprocessor compares the actual rear wheel speed to the theoretical ramp. If the rear wheel deceleration reaches a predetermined value, such as, for example, 1.3 g, the microprocessor determines that the rear wheel brakes 20a and 20b may be approaching a rear wheel lock-up condition. Accordingly, the ABS microprocessor closes the isolation valve 22 to isolate the rear wheel brakes 20a and 20b from the master cylinder 14. If the rear wheel speed departs form the theoretical ramp in addition to, or in place of, the deceleration condition, the ABS microprocessor determines that the rear wheel brakes 20a and 20b are certainly approaching a lock-up condition and the microprocessor maintains the isolation valve 22 in the closed position. The ABS microprocessor then selectively opens the dump valve 26 to reduce the pressure applied to the rear wheel brakes 20a and 20b to correct the rear wheel speed departure. Once the wheel speed departure has been corrected and the controlled wheel has spun up to the vehicle speed, the microprocessor opens the isolation valve to initiate a second wheel speed departure to adjust the rear wheel brake pressure upward.

The operation of the RWAL system is illustrated by the graphs shown in FIG. 2. The upper curve shows the rear wheel speed as a function of time while the lower curve shows the rear wheel brake pressure as a function of time. The middle curves illustrate the operation of the isolation and dump valves 22 and 26 as a function of time. The solid curve labeled 60 represents the velocity of the rear wheels while the dashed curve labeled 64 represents the vehicle velocity. The first and second wheel speed departures are labeled 60a and 60b, respectively. Following correction of the second wheel speed departure, which occurs at time $t_7$, the rear wheel brake pressure is maintained a constant level $P_e$, as shown in the lower curve.

If the vehicle transitions from a low mu to a high mu road surface, a key feature included in the algorithm utilized by the RWAL system 10 is a corresponding increase in the braking effort exerted by the rear wheel brakes 20a and 20b to utilize the increased mu. An example of such a transition is shown at $t_8$ in FIG. 2. The road surface transition can be detected when the microprocessor detects an increased vehicle deceleration due to the greater braking effect of the uncontrolled front wheel brakes 19a and 19b upon the higher mu road surface. Typically, if the vehicle deceleration increases by a predetermined amount, such as 0.25 g, from a vehicle deceleration value measured near the beginning of the stop, it is known to reopen the isolation valve 22 to generate an unlimited series of reapply pulses 62b. The resulting increased pressure to the rear wheel brakes 20a and 20b initiates a third wheel speed departure, which is labeled 60c in FIG. 2. At time $t_{10}$, a dump pulse 63d is generated to open the dump valve 26 to reduce the rear wheel brake pressure to a level $P_g$ to correct the third rear wheel departure. Thereafter, the rear wheel brake pressure is held at the level $P_g$, which is greater than the previously held level $P_e$.

SUMMARY

This invention relates to an improved control algorithm for an anti-lock brake system which provides improved control of wheel brake pressure on speed sensitive road surfaces.

It has been determined that on speed sensitive surfaces such as wet ceramic tile or wet jennite, mu increases gradually as vehicle speed decreases, even though there is no change from one type of surface to another. This condition is often referred to speed sensitivity of the road surface. Eventually, near the end of a stop, the increased mu can cause the change in vehicle deceleration to exceed the threshold value for detecting a low-to-high mu transition and the microprocessor initiates an additional wheel speed departure. However, the associated pressure cycling activity occurring near the end of the stop does not significantly improve the deceleration of the vehicle. Accordingly, it would be desirable to avoid such pressure cycling activity near the end of the anti-lock braking cycle. Additionally, it would be desirable to increase the braking effort of the controlled rear wheel brakes 20a and 20b to better utilize the increased road surface mu throughout a large portion of the stop.

The present invention contemplates an anti-lock brake system for controlling at least one vehicle wheel brake, the system comprising a valving device adapted to be connected to a vehicle brake system. The valving device is operable to control the pressure of brake fluid applied to the controlled wheel brake. The system also includes a sensor for measuring the speed of a vehicle wheel associated with the controlled wheel brake and a microprocessor electrically connected to the valving device and the sensor. The microprocessor is responsive to the sensor to compute a vehicle deceleration and to actuate the valving means to increase the brake fluid pressure applied to the controlled wheel brake when the vehicle deceleration exceeds a predetermined deceleration threshold. The microprocessor is further operable to increase the deceleration threshold by a predetermined deceleration increment when a predetermined condition is met.

In the preferred embodiment, the microprocessor is also responsive to said wheel speed sensor to compute a vehicle speed and the predetermined condition is a predetermined vehicle speed threshold. The microprocessor being operable to increase the deceleration threshold by the deceleration increment when the vehicle speed falls below the vehicle speed threshold.

Additionally, the increase in the vehicle speed increment can be delayed by a predetermined time period following the vehicle speed falling below the vehicle speed threshold.

The present invention also contemplates that the microprocessor is responsive to the wheel speed sensor to compute a vehicle deceleration and to actuate the valving means to increase the brake fluid pressure applied to the controlled wheel brake when the vehicle deceleration exceeds either of a first or second deceleration thresholds. In the preferred embodiment, the second deceleration threshold being less than the first deceleration threshold. The microprocessor is further operable to increase the first and second deceleration thresholds after a predetermined time period elapses, the predetermined time period commencing with said increase of the brake fluid pressure. It is contemplated that the first and second deceleration thresholds are each increased by a predetermined deceleration increment.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

As indicated above, a key feature of the algorithm used in a RWAL system is recognition of a low-to-high mu road surface transition. As also indicated above, the transition can be detected by monitoring the vehicle deceleration. If the microprocessor detects that the vehicle deceleration has changed by a predetermined amount, which in the discussion below is referred to as DVCTH, the microprocessor determines that the road surface mu has increased. In the preferred embodiment, DVCTH is 0.25 g and a threshold DVREF for determining the road surface transition is computed by adding DVCTH to a reference vehicle deceleration value, which is referred to as DVEH and is measured near the beginning of the stop.

Figure 1:
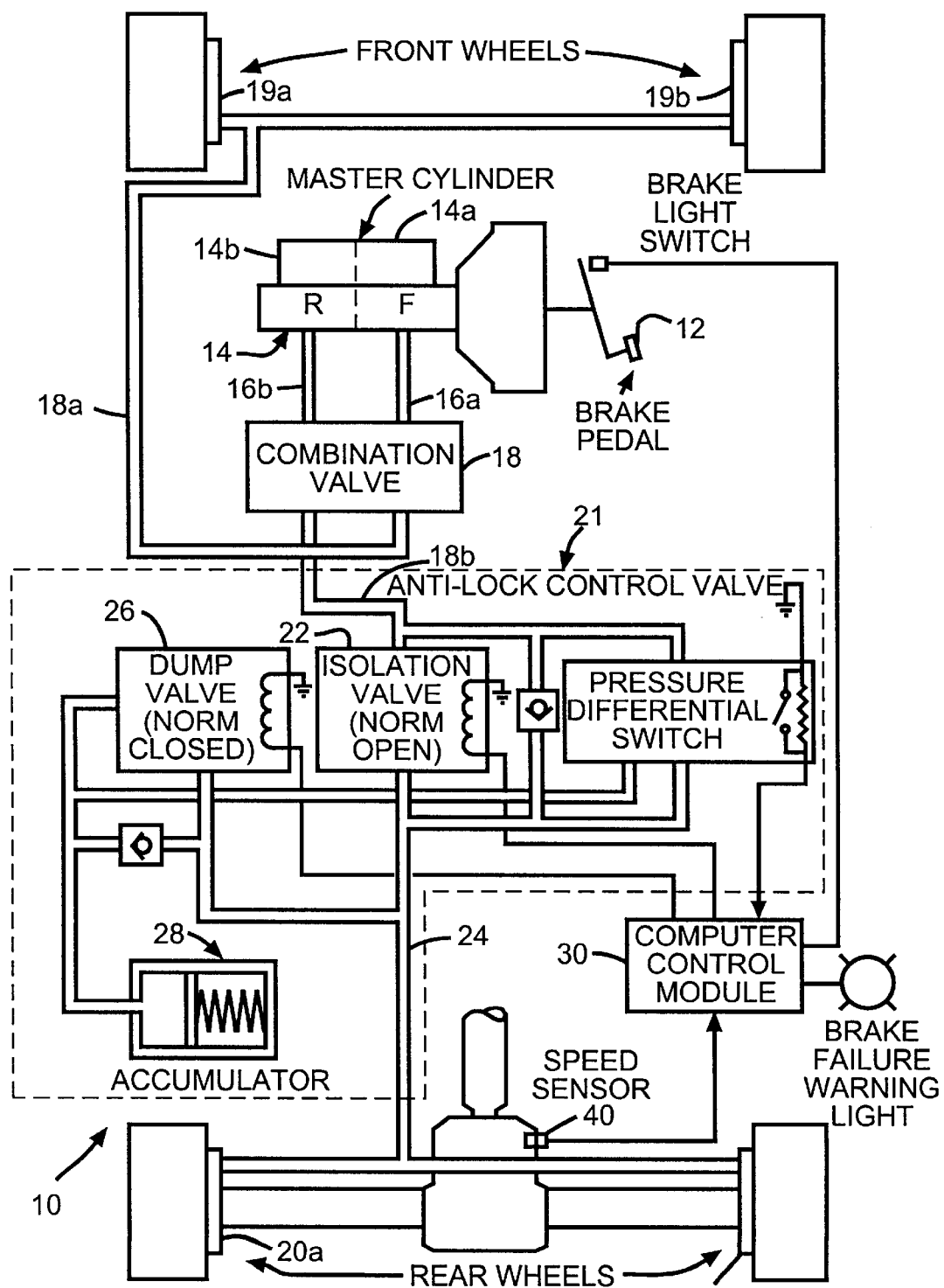
FIG. 1 is a schematic diagram of a prior art passive rear wheel anti-lock brake system.
Figure 2:
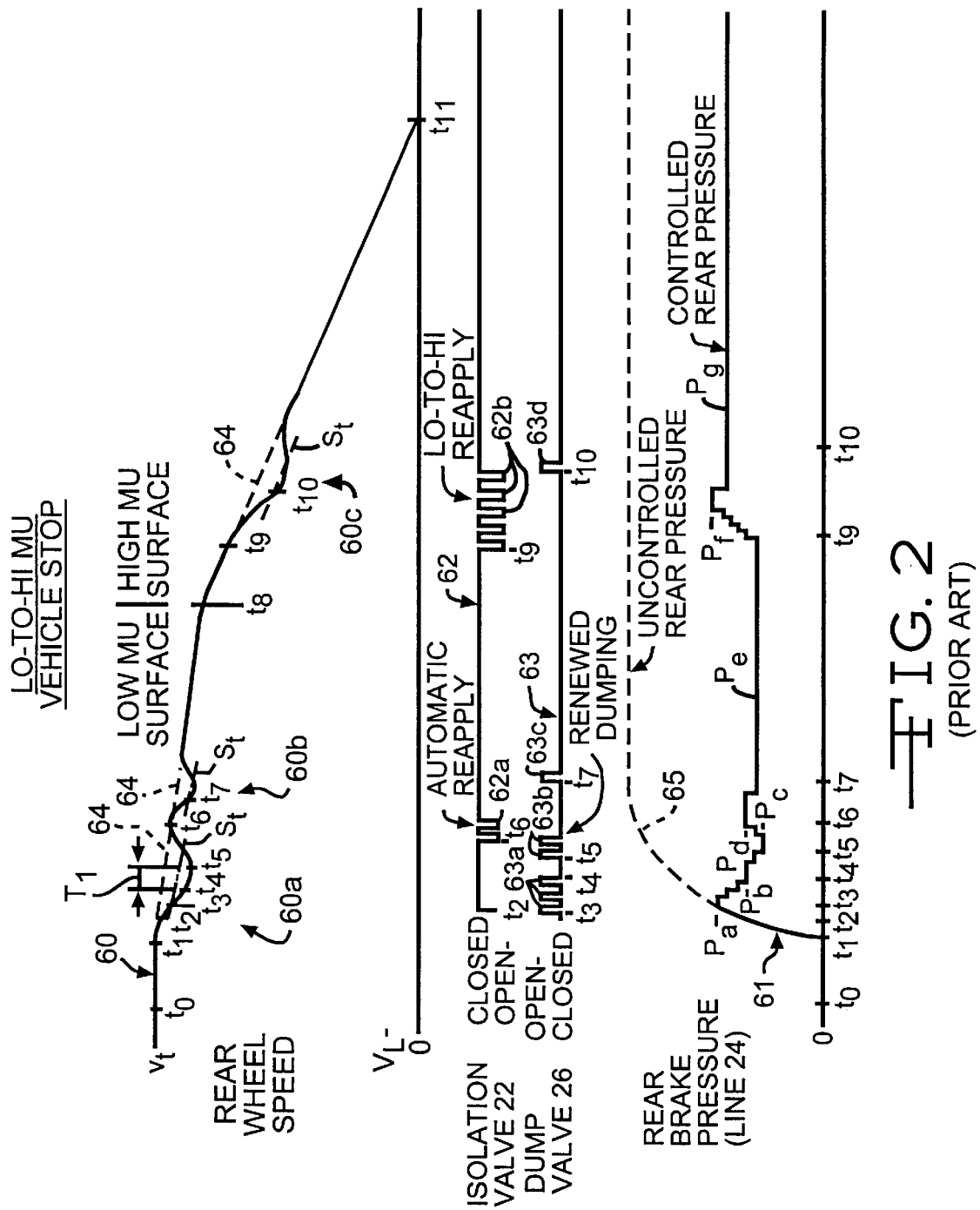
FIG. 2 illustrates the operation of the rear wheel anti-lock brake system shown in FIG. 1.
Figure 3:
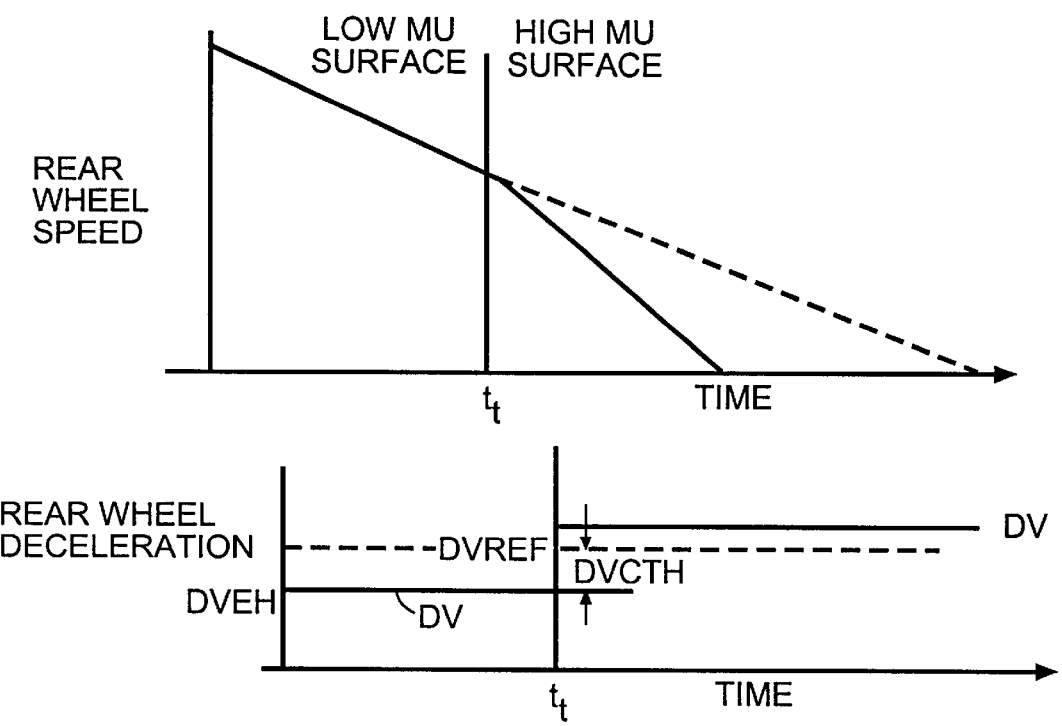
FIG. 3 is a graph of rear wheel speed and deceleration during a low-to-high road surface mu transition.

Referring now to FIG. 3, there is illustrated the relationship between the rear wheel speed and deceleration during a low-to-high mu road surface transition. The upper curve represents the rear wheel speed during an anti-lock braking cycle while the lower curve represents the vehicle deceleration, DV, which is related to the slope of the upper wheel speed curve. For simplicity, the absolute value of the vehicle deceleration is shown. As described above, near the beginning of the anti-lock brake cycle, the microprocessor calculates the reference vehicle deceleration value DVEH. The microprocessor also computes the threshold for detecting a low-to-high mu transition DVREF which is also shown on the lower curve.

For illustrative purposes, it has been assumed that the vehicle deceleration DV is constant and equal to the reference vehicle deceleration value DVEH. At $t_t$ the vehicle crosses from a low mu road surface to a high mu road surface. The increased mu causes an increase in the deceleration curve DV. Since DV exceeds DVREF, the microprocessor determines that a surface transition has occurred and initiates another wheel speed departure, which has been omitted from FIG. 3 for simplicity.

Figure 4:
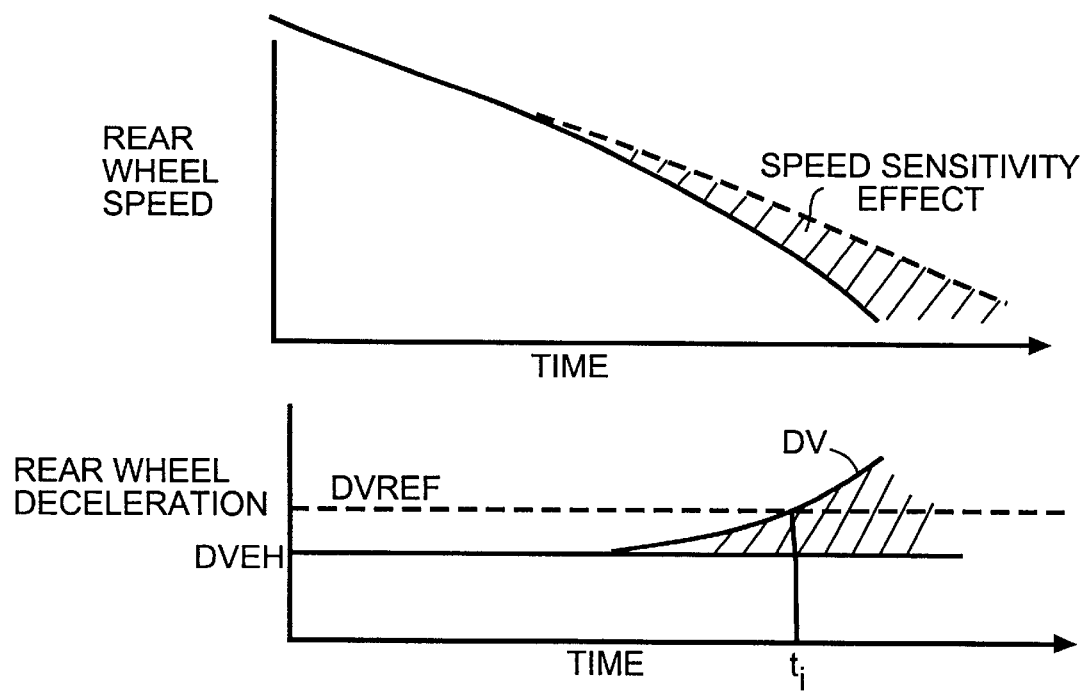
FIG. 4 is a graph of rear wheel speed and deceleration which illustrates road surface speed sensitivity.

As explained above, it has been determined that on speed sensitive surfaces such as wet ceramic tile or wet jennite, mu increases gradually as vehicle speed decreases, even though there is no change from one type of surface to another. This condition is often referred to road surface speed sensitivity and is illustrated in FIG. 4 where the upper curve represents the rear wheel speed while the lower curve represents vehicle deceleration. The region representing road surface speed sensitivity is shaded in both curves in FIG. 4. Eventually, near the end of the stop, the increased mu can cause the change in vehicle deceleration to exceed the threshold value DVREF for detecting a low-to-high mu transition and the microprocessor initiates an additional wheel speed departure. However, the associated pressure cycling activity occurring near the end of the stop does not significantly improve the average deceleration of the vehicle over the entire stop. Accordingly, it would be desirable to avoid such pressure cycling activity near the end of the anti-lock braking cycle. Additionally, it would be desirable to increase the braking effort of the controlled rear wheel brakes 20a and 20b to better utilize the increased road surface mu throughout a large portion of the stop.

The present invention contemplates modifying the control algorithm to incrementally increase the threshold value DVREF during the later portion of an anti-lock braking cycle to preclude road surface speed sensitivity causing another wheel speed departure. In a typical ABS, the microprocessor algorithm periodically measures the rear wheel deceleration. In the preferred embodiment, the rear wheel speed is measured and the vehicle deceleration DV computed every 300 milliseconds (msec). Accordingly, in the preferred embodiment, the algorithm increases DVREF by a small amount every 300 msec. It will be appreciated, however, that other time periods can be used to increase DVREF. As stated above, the algorithm increases DVREF during the later portion of an anti-lock braking cycle which is determined when the vehicle speed drops below a vehicle speed threshold, which, in the preferred embodiment, is 30 mph (48 kph). As before, it will be appreciated that the invention also can be practiced with other speed threshold values.

Figure 5:
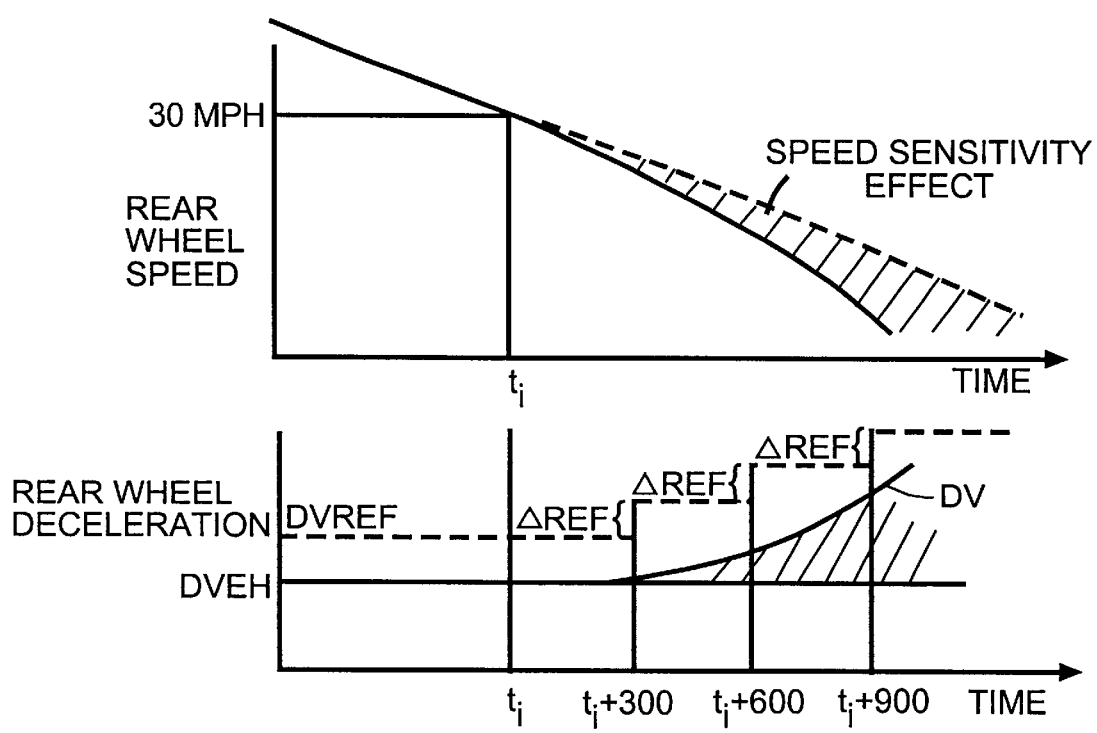
FIG. 5 is a graph of rear wheel speed and deceleration which illustrates a method of compensating for road surface speed sensitivity in accordance with the invention.

The application of the modified algorithm is illustrated by the curves in FIG. 5 where the upper curve again represents the rear wheel speed while the lower curve represents the vehicle deceleration. As before, the region representing road surface speed sensitivity is shaded. For simplicity, the vehicle deceleration curve DV is shown as a smooth continuous line instead of a series of steps which would result from the sampling periods described above. At $t_1$, the vehicle speed drops below a predetermined threshold speed, which is 30 mph in the preferred embodiment, and the algorithm starts a timer. After a predetermined time period, which, in the preferred embodiment, is 300 milliseconds, elapses, the algorithm adds a first increment, delta REF, to DVREF, as shown in the lower curve. Additional incremental increases of delta REF are made to DVREF every 300 msec for the remainder of the anti-lock braking cycle. As shown in the lower curve, DV never crosses the increased threshold DVREF and, therefor, no additional wheel speed departure occurs. The incremental increase can be a small fixed value; however, in the preferred embodiment, the incremental increases are proportional to the width of extra reapply pulses that occur at preselected speed decrements. These extra reapply pulses, which are intended to compensate for temperature induced brake lining friction decrease and brake drum expansion, are described in co-pending PCT Patent Application No. US98/13,375 filed on Jun. 26, 1998.

Figure 6:
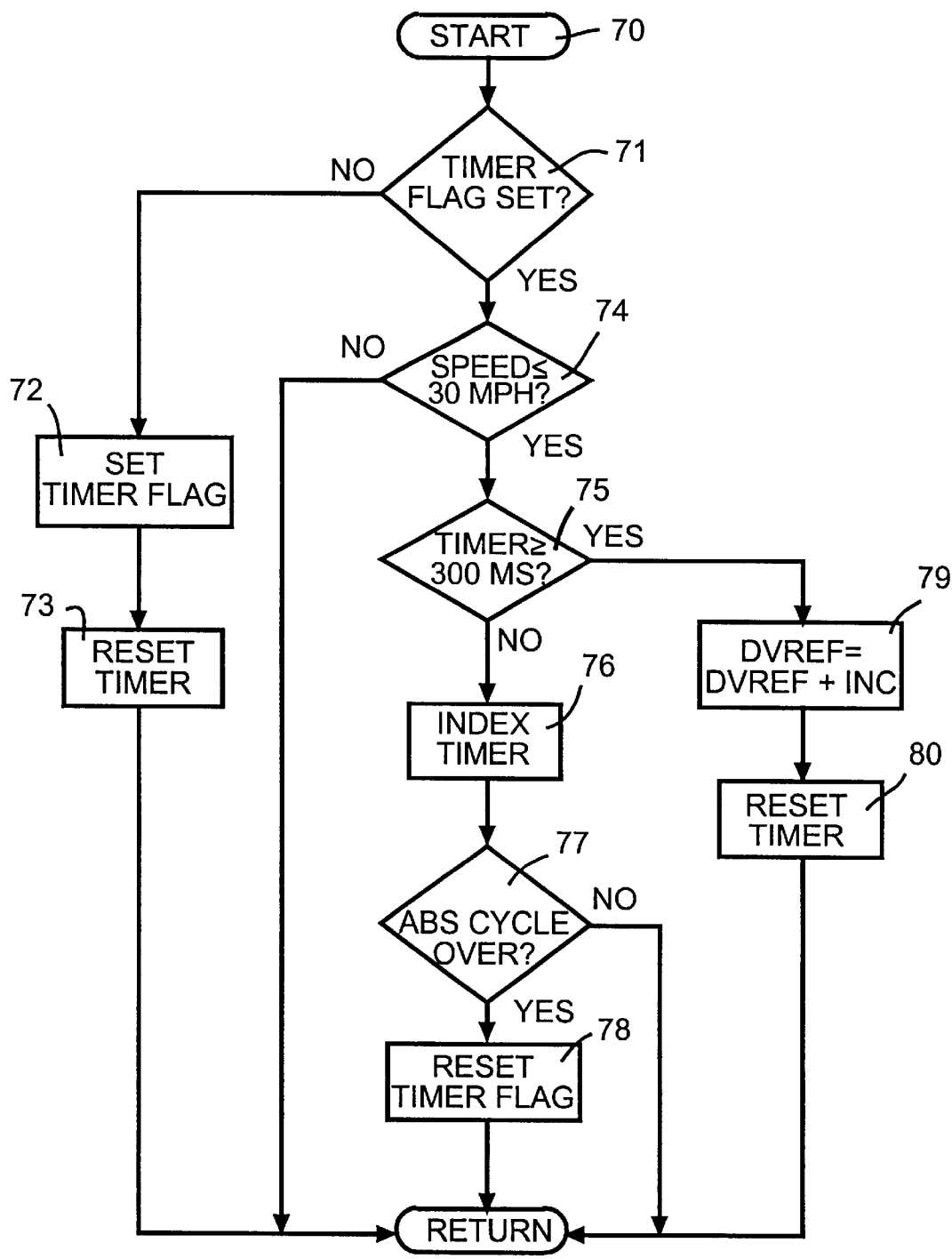
FIG. 6 is a flow chart of an algorithm for implementing the method shown in FIG. 5.

A simplified flow chart of an algorithm for implementing the above described procedure is shown in FIG. 6. The algorithm is entered from the main ABS control algorithm in block 70 during each iteration of the main control algorithm. In decision block 71, the algorithm checks to determine if a timer flag has been set to initialize a timer. If the timer flag has not been set, the algorithm transfers first to functional block 72 to set the timer flag and then to functional block 73 to reset the timer to zero. The algorithm then returns to the main control algorithm.

During the next iteration, the algorithm will transfer from decision block 71 to decision block 74, where the rear wheel speed is compared to a threshold. As shown, if the rear wheel speed is greater than 30 mph, the algorithm returns to the main control algorithm. If the rear wheel speed is less than or equal to 30 mph, the algorithm transfers to decision block 75.

In decision block 75, the elapsed time is checked. If the elapsed time is less than the predetermined time period, which is shown as 300 msec, the timer is indexed in functional block 76. The algorithm then transfers to functional block 77 to determine if the Anti-lock braking cycle has ended. If the cycle has not ended, the algorithm returns to the main control program. If the cycle has ended, the algorithm resets the timer flag in functional block 78 and then returns to the main control program. If the elapsed time is greater than or equal to 300 msec, the algorithm transfers from decision block 75 to functional block 79 where the transition detection threshold DVREF is increased by the increment INC. The timer is then reset in functional block 80 and the algorithm returns to the main control program.

It will be appreciated that the flow chart shown in FIG. 6 is presented for illustrative purposes and that different flow charts can be utilized to implement the invention. Additionally, while the first incremental increase is shown as being added to DVREF 300 msec after the vehicle speed drops below the speed threshold of 30 mph, it will be appreciated that the invention also can be practiced with the first incremental increase being added to DVREF upon the vehicle speed dropping below the speed threshold (not shown).

While the algorithm described above avoids another wheel speed departure at the end of an anti-lock braking cycle, the algorithm does not utilize the increased mu of the road surface. Accordingly, the present invention contemplates an alternate embodiment which can increase the braking force of the rear wheel brakes 20a and 20b when road surface speed sensitivity is present. The alternate embodiment includes a second deceleration threshold, RXDVREF, which is equal to the vehicle speed slope at the beginning of the stop DVEH plus a small increment. In the preferred embodiment, the second threshold is initially set as:

$$RXDVREF=DVEH+0.05 \text{ g}.$$

While an increment of 0.05 g is used in the preferred embodiment, it will be appreciated that the invention also can be practiced using different values for the increment.

Figure 7:
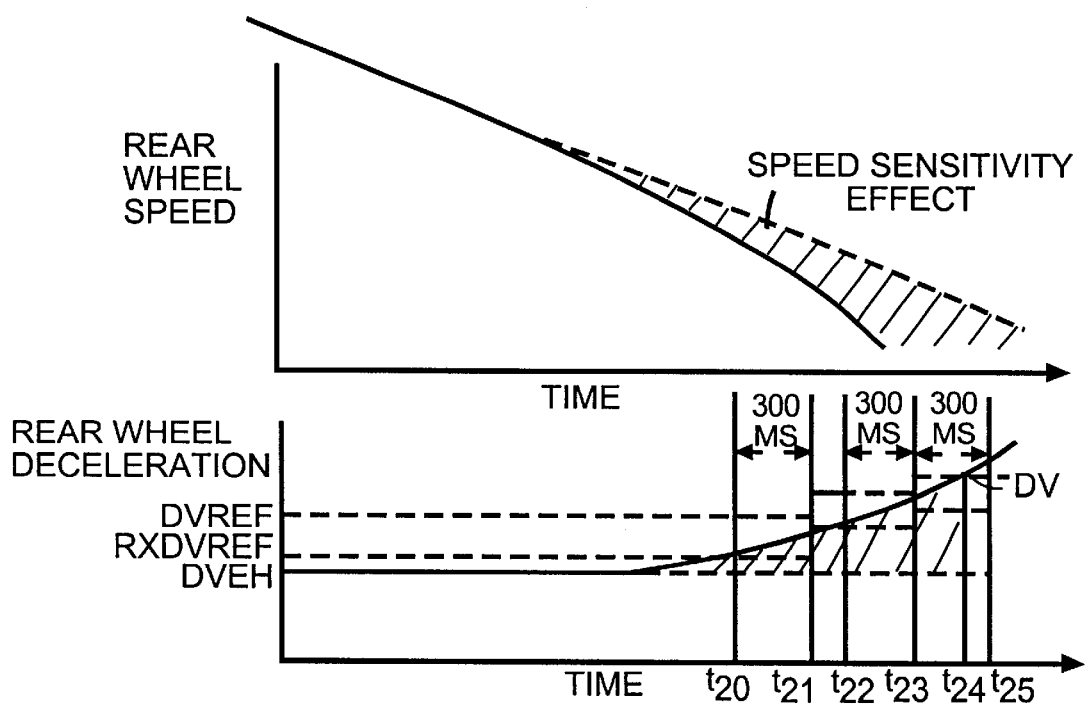
FIG. 7 is a graph of rear wheel speed and deceleration which illustrates an alternate embodiment of the invention.

The operation of the alternate algorithm is illustrated in FIG. 7 where the upper curve represents rear wheel speed and the lower curve represents rear wheel deceleration. The algorithm is operative to generate a single reapply pulse whenever the vehicle deceleration DV exceeds RXDVREF. As shown in FIG. 7, this occurs at $t_{20}$. Accordingly, a single reapply pulse is generated at $t_{20}$. The single reapply pulse is in addition to the extra reapply pulses described above which are generated at preselected speed decrements. The second threshold RXDVREF is increased by another increment of 0.05 g after the single reapply pulse has been generated in anticipation of a possible further gradual increase of the road mu on a speed sensitive surface. The threshold DVREF also is similarly increased by the same increment 0.05 g in order to avoid a disruption of an unlimited low-to-high mu that is not needed because the increase in road mu has already been taken advantage of by the mu-responsive extra reapply pulse. However, the 0.05 g increase in the thresholds RXDVREF and DVREF is delayed until $t_{21}$, which is 300 msec after the generation of the mu-responsive extra reapply pulse. The delay allows the algorithm to recognize a true road surface change that does not happen abruptly, but would result in an unlimited reapply being applied. The vehicle deceleration DV again exceeds the increased RXDVREF at $t_{22}$ and a second reapply pulse is generated. After another 300 msec delay, the thresholds RXDVREF and DVREF are again incrementally increased at $t_{23}$. As can be seen in FIG. 7, the vehicle deceleration DV has continued to increase and exceeds the new value for RXDVREF. Accordingly, a third reapply pulse is generated at $t_{23}$ and another 300 millisecond delay initiated. However, at $t_{24}$, the vehicle deceleration DV exceeds low-to-high mu transition threshold DVREF, indicating that a low-to-high mu road surface transition has occurred and causing the algorithm to generate an unlimited series of reapply pulses. It is noted that $t_{24}$ occurs before the next time $t_{25}$ for increasing the thresholds RXDVREF and DVREF.

Figure 8:
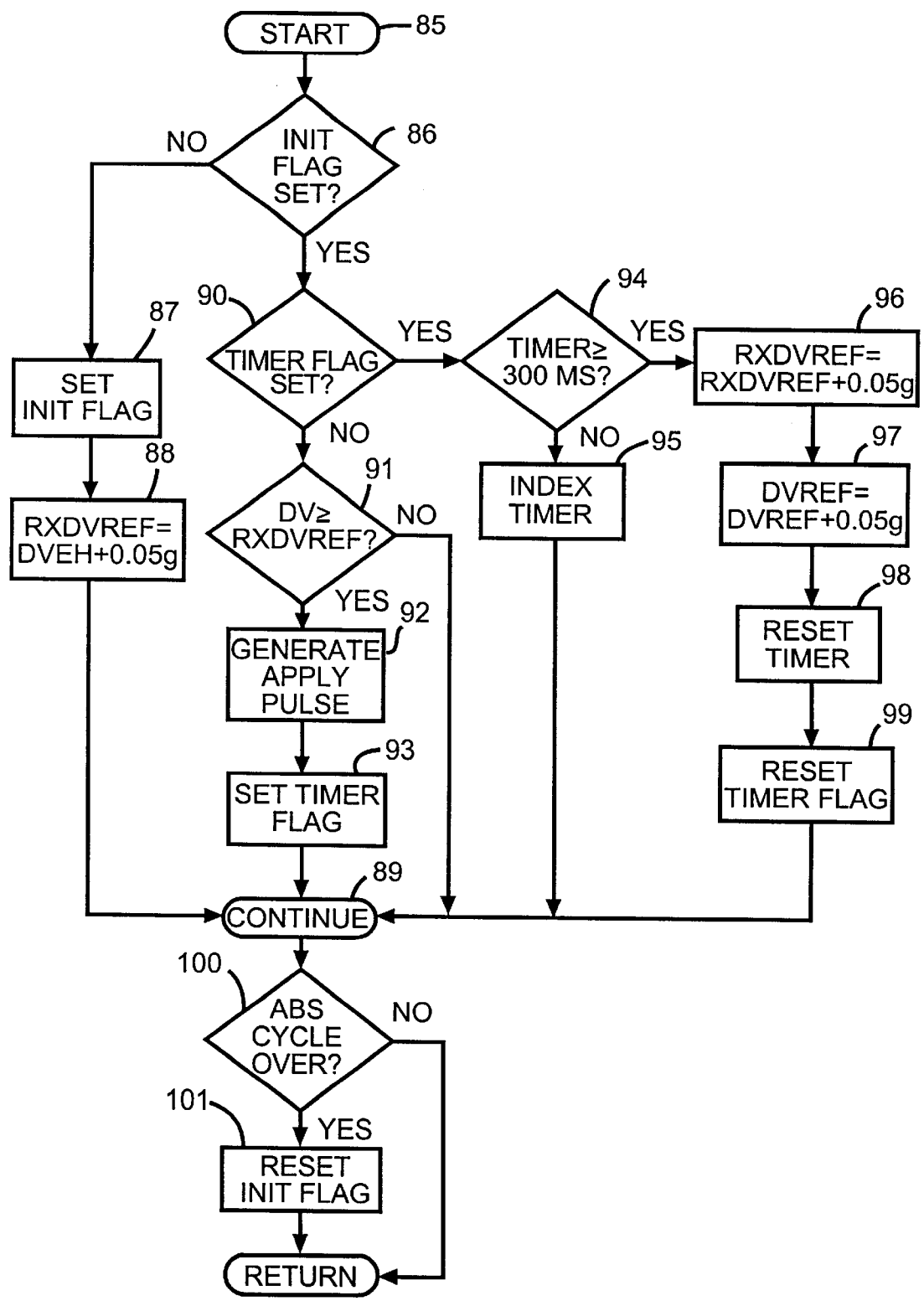
FIG. 8 is a flowchart of an algorithm for implementing the method shown in FIG. 7.

A simplified flow chart of an algorithm for implementing the above described procedure is shown in FIG. 8. When the vehicle is started, the ABS microprocessor sets an initialization flag and an algorithm timer flag FALSE, or NOT SET. The algorithm is entered from the main ABS control algorithm in block 85 during each iteration of the main control algorithm. In decision block 86, the algorithm checks an algorithm initialization flag. If the initialization flag has not been set, the algorithm sets the flag in functional block 87 and computes the initial value for RXDVREF in functional block 88. The algorithm then transfers to a continue block 89.

If the algorithm initialization flag has been set, the algorithm transfers from decision block 86 to decision block 90 where a timer flag is checked. If the timer flag has not been set, the algorithm transfers to decision block 91 where the deceleration DV is compared to the second threshold value RXDVREF. If DV is less than RXDVREF, the algorithm transfers to the continue block 89. If DV is greater than or equal to RXDVREF, the algorithm transfers to functional block 92 to generate a single reapply pulse and then to functional block 93 where the timer flag is set to begin the 300 msec delay. The algorithm then transfers to the continue block 89.

After the apply pulse has been generated, the timer flag is set and, on the next iteration, the algorithm will transfer from decision block 90 to decision block 94 where the elapsed time since generating the apply pulse is checked. If the elapsed time is less than 300 msec, the algorithm indexes the timer in functional block 95 and then transfers to the continue block 89. If the elapsed time is greater than or equal to 300 msec, the algorithm transfers functional block 96 to increment the thresholds RXDVREF and DVREF.

In functional block 96, the second threshold RXDVREF is increased by 0.05 g. The algorithm then continues to functional block 97 where the first threshold DVREF is increased by 0.05 g. The algorithm transfers to functional block 98 where the timer is reset and functional block 99 where the timer flag is reset. The algorithm then transfers to the continue block 89.

From the continue block 89, the algorithm transfers to decision block 100 where a check is made to determine if the ABS braking cycle has ended. If the braking cycle has not ended, the algorithm returns to the main ABS control algorithm. If the braking cycle has ended, the algorithm transfers to functional block 101 where the initialization flag is reset. The algorithm then returns to the main ABS control algorithm.

Figure 9:
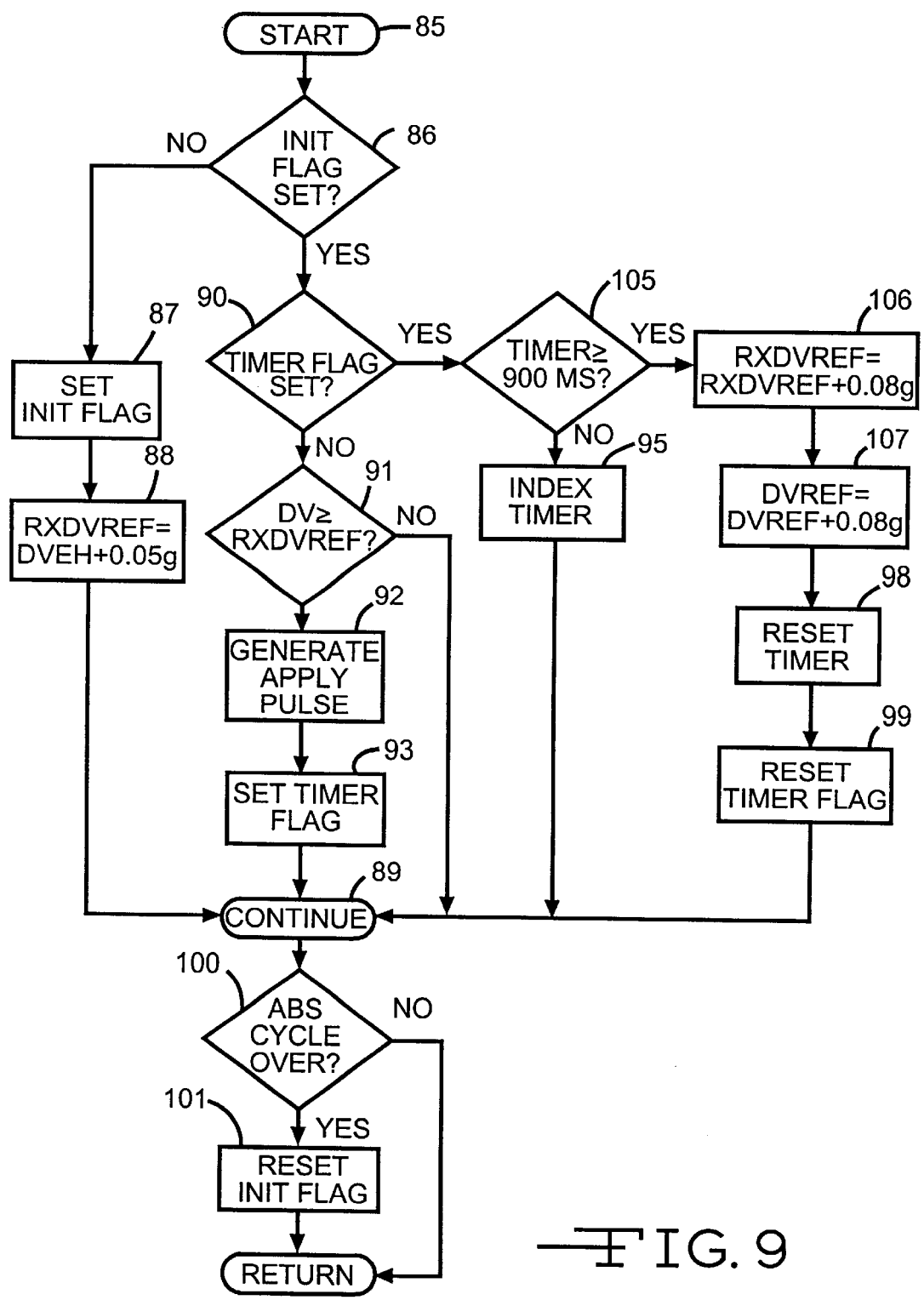
FIG. 9 is a flowchart of another algorithm for implementing the method shown in FIG. 7.

While the preferred embodiment has been described and illustrated with RXDVREF when DVREF being incrementally increased by 0.05 g after a 300 msec delay, it will be appreciated that the invention also can be practiced with other values for the incremental increase and delay. For example, an alternate embodiment is illustrated by the flow chart shown in FIG. 9 with RXDVREF when DVREF being incrementally increased by 0.08 g after three time periods, or 900 msec. In FIG. 9, blocks which are the same as shown in FIG. 8 have the same numerical designators. Accordingly, in decision block 105, the timer content is compared to 900 msec. If the timer content is less than or equal to 900 msec, the algorithm transfers to functional block 95 where the timer is indexed. However, if the timer content exceeds 900 msec. in decision block 105, the algorithm transfers to functional block 106 where RXDVREF is increased by 0.08 g. The algorithm then proceeds to functional block 107 where DVREF also is increased by 0.08 g.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, several illustrative flowcharts have been shown and described; however, it will be appreciated that the invention also can be practiced with other specific algorithms having flow charts which differ from the ones shown in the figures.

What is claimed is:

1. An anti-lock brake system for controlling at least one vehicle wheel brake, the system comprising;
    a valving device adapted to be connected to a vehicle brake system, said valving device being operable to control the pressure of brake fluid applied to the controlled wheel brake;
    a sensor adapted to measure the speed of a vehicle wheel associated with the controlled wheel brake; and
    a microprocessor electrically connected to said valving device and said sensor, said microprocessor responsive to said sensor to compute a vehicle deceleration and a vehicle speed, said microprocessor also operable to actuate said valving means to increase the brake fluid pressure applied to the controlled wheel brake when said vehicle deceleration exceeds a predetermined deceleration threshold, said microprocessor being further operable to increase said deceleration threshold by a first predetermined deceleration increment when said vehicle speed falls below a vehicle, said microprocessor being further operative to increase said deceleration threshold by a second predetermined deceleration increment after a predetermined time period elapses following said first increase.

2. An anti-lock brake system for controlling at least one vehicle wheel brake, the system comprising;
    a valving device adapted to be connected to a vehicle brake system, said valving device being operable to control the pressure of brake fluid applied to the controlled wheel brake;
    a sensor adapted to measure the speed of a vehicle wheel associated with the controlled wheel brake; and a microprocessor electrically connected to said valving device and said sensor, said microprocessor responsive to said sensor to compute a vehicle deceleration, said microprocessor also operable to actuate said valving means to increase the brake fluid pressure applied to the controlled wheel brake when said vehicle deceleration exceeds a predetermined deceleration threshold, said microprocessor being further operable to increase said deceleration threshold by a predetermined deceleration increment after said predetermined time period has elapsed.

3. An anti-lock brake system according to claim 2 wherein said microprocessor is also responsive to said wheel speed sensor to compute a vehicle speed and further wherein said predetermined time period begins to run after said vehicle speed falls below a predetermined vehicle speed threshold.

4. An anti-lock brake system according to claim 3 wherein said predetermined deceleration increment is a first deceleration increment and said microprocessor is further operative to increase said deceleration threshold by a second predetermined deceleration increment after a predetermined time period elapses following said first increase.

5. A method for controlling at least one vehicle wheel brake, the method comprising the steps of:
   (a) providing a valving device for controlling the application of a pressurized fluid to the controlled wheel brake and a wheel speed sensor for monitoring the speed of a vehicle wheel associated with the controlled wheel brake, the valving device and wheel speed sensor being coupled to a microprocessor;
   (b) sensing the speed of the vehicle and using the speed to calculate a vehicle deceleration;
   (c) determining a deceleration threshold and causing the valve means to increase the pressure applied to the controlled brake when the calculated deceleration is greater than the deceleration threshold; and
   (d) increasing the deceleration threshold after a predetermined time period has elapsed following the vehicle speed being one of less than and equal to a predetermined speed threshold.

6. An anti-lock brake system for controlling at least one vehicle wheel brake, the system comprising;
   a valving device adapted to be connected to a vehicle brake system, said valving device being operable to control the pressure of brake fluid applied to the controlled wheel brake;
   a sensor adapted to measure the speed of a vehicle wheel associated with the controlled wheel brake; and
   a microprocessor electrically connected to said valving device and said sensor, said microprocessor responsive to said wheel speed sensor to compute a vehicle deceleration, said microprocessor also operable to actuate said valving means to increase the brake fluid pressure applied to the controlled wheel brake when said computed vehicle deceleration exceeds one of a first deceleration threshold or a second deceleration threshold, said second deceleration threshold being less than said first deceleration threshold, said microprocessor being further operable to increase said first and second deceleration thresholds after a predetermined time period elapses, said predetermined time period commencing with said increase of said brake fluid pressure.

7. An anti-lock brake system according to claim 6 wherein said first and second deceleration thresholds are each increased by a predetermined deceleration increment.

8. An anti-lock brake system according to claim 7 wherein said second deceleration threshold is determined by adding the initial vehicle deceleration when the vehicle brakes are first applied to said predetermined deceleration increment.

9. A method for controlling at least one vehicle wheel brake, the method comprising the steps of:
   (a) providing a valving device for controlling the application of a pressurized fluid to the controlled wheel brake and a wheel speed sensor for monitoring the speed of a vehicle wheel associated with the controlled wheel brake, the valving device and wheel speed sensor being coupled to a microprocessor;
   (b) sensing the speed of the vehicle and using the speed to calculate a vehicle deceleration;
   (c) determining first and second deceleration thresholds and causing the valve means to increase the pressure applied to the controlled brake when the calculated vehicle deceleration is greater than one of the first or second deceleration thresholds; and
   (d) increasing the first and second deceleration thresholds when the calculated vehicle deceleration is greater than one of the first or second deceleration thresholds.

10. A method according to claim 9 wherein the deceleration thresholds are increased in step (d) after a predetermined time period has elapsed following the calculated vehicle deceleration is greater than one or the first and second deceleration thresholds.

* * * * *